Patented Dec. 26, 1933

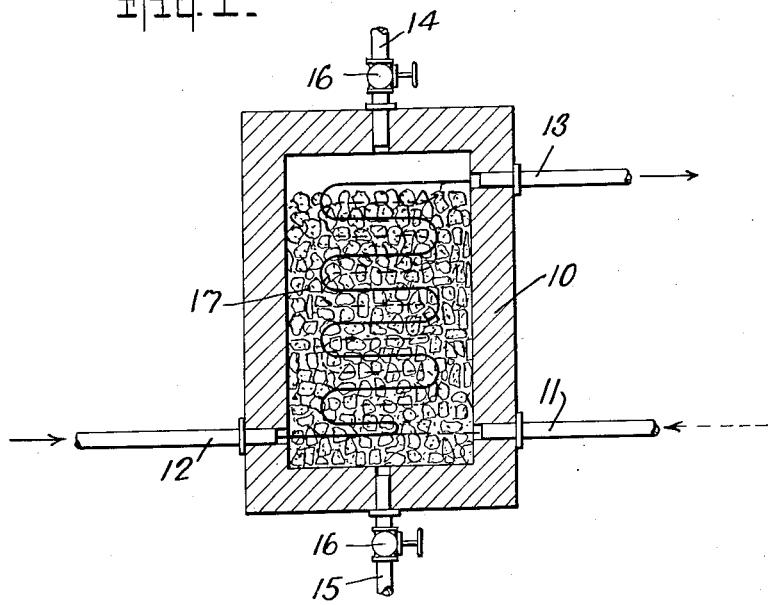
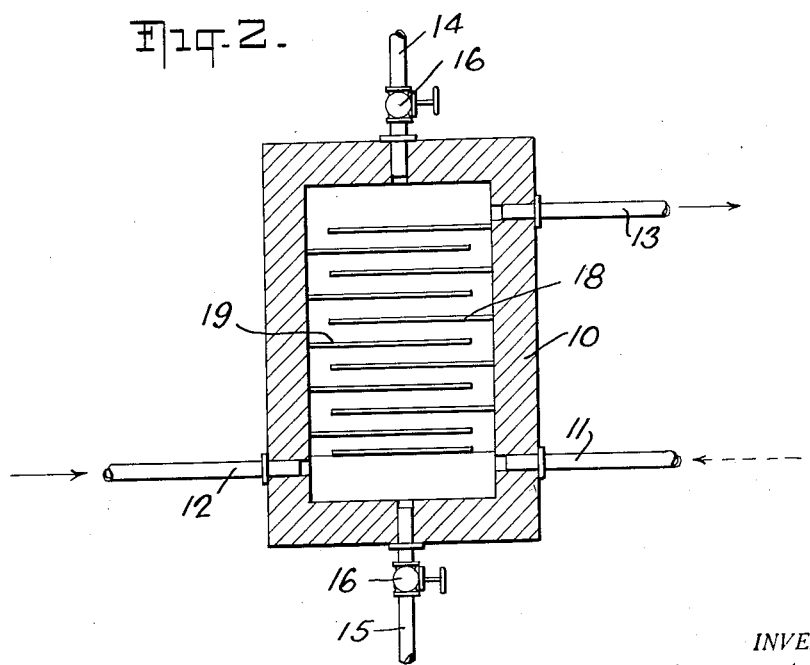

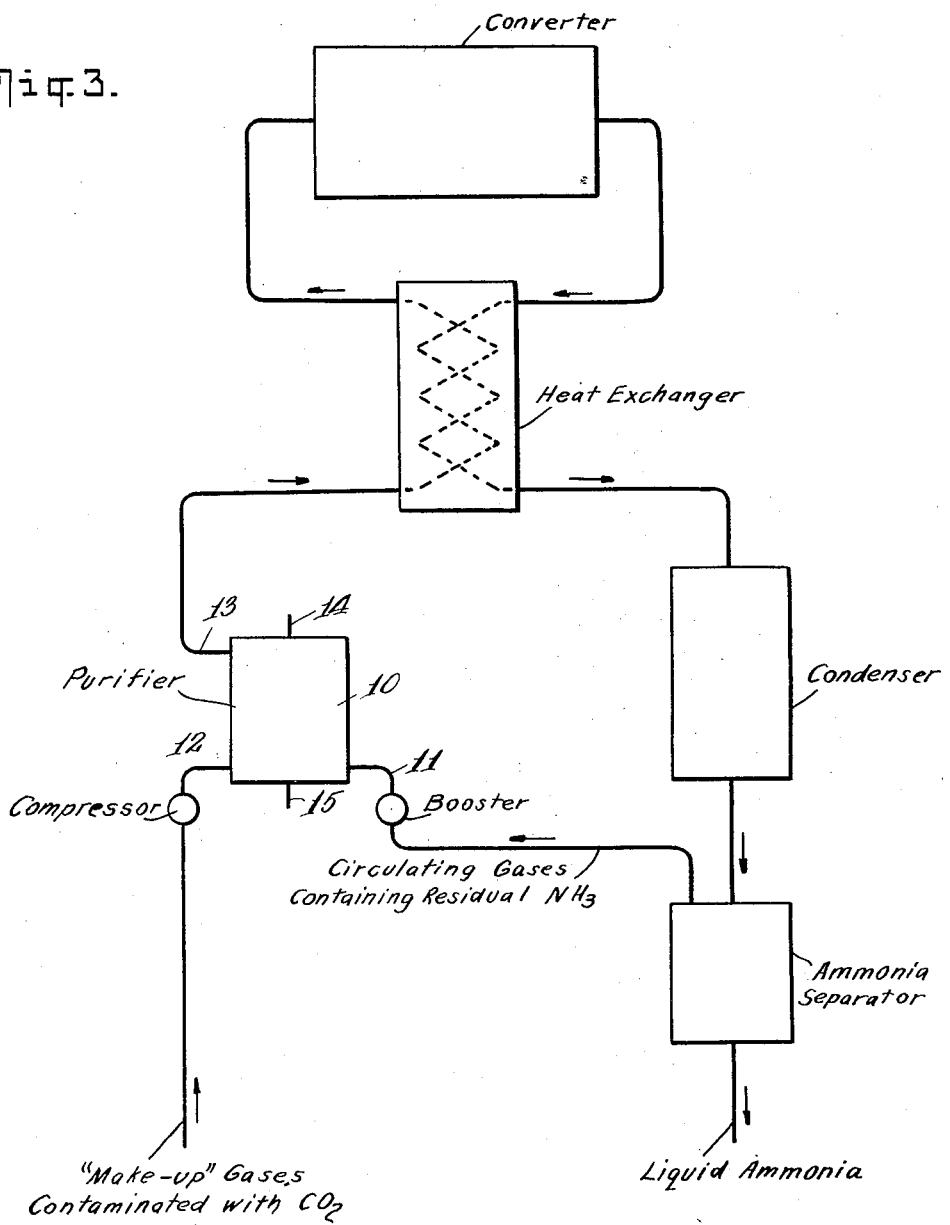

1,940,860

UNITED STATES PATENT OFFICE 1,940,860

SYNTHETIC PRODUCTION OF AMMONIA

Arthur E. Hecker, Niagara Falls, N. Y., assignor to The Mathieson Alkali Works, Inc., New York, N. Y., a corporation of Virginia Application January 13, 1928. Serial No. 246,484

4 Claims. (Cl. 23—198)

This invention relates to processes of fixation of nitrogen and, more particularly, to the synthetic production of ammonia by those processes in which mixtures of hydrogen and nitrogen are caused to combine by passage over a catalyst.

A general object of the invention is to provide improved apparatus and procedural steps by which the production of ammonia can be accomplished in an efficient and economical manner.

A more specific object of the invention is to provide means for efficiently removing certain impurities from the mixture of gases prior to passing it over the catalyst.

Other objects of the invention will in part be obvious and will in part appear hereinafter.

The invention accordingly comprises the several steps and the relation and order of one or more of such steps with respect to each of the others, and the apparatus embodying features of construction, combinations of elements and arrangement of parts which are adapted to effect such steps, all as exemplified in the following detailed disclosure, and the scope of the application of which will be indicated in the claims.

For a fuller understanding of the nature and objects of the invention reference should be had to the following detailed description taken in connection with the accompanying drawings, in which:

Figure 1 is a longitudinal sectional view of one embodiment of the apparatus;

Fig. 2 is a similar view of another embodiment of the apparatus; and

Fig. 3 is a diagram, in the nature of a flow sheet, illustrating one embodiment of the process.

Ammonia is made synthetically in a circulating system through which a suitable mixture of hydrogen and nitrogen is pumped under pressure and at elevated temperature over a catalyst, which causes the hydrogen and nitrogen to combine to form ammonia. While various types of apparatus have been suggested for this purpose, this system generally includes, among other things, a converter or reaction chamber, which holds the catalyst over which the mixture of hydrogen and nitrogen is passed; heat exchanges which raise or lower the temperature of the gases going into or coming from the reaction chamber; coolers, liquefiers or condensers which condense a part of the ammonia which has been formed in the reaction chamber; receivers which collect the liquid ammonia from the condenser and allow the remaining mixture of hydrogen, nitrogen and ammonia to pass on; and a circulating pump or compressor which raises the pressure of the circulating gases to that of the new or "make-up" gases which are supplied to replace that which was removed as ammonia. The "make-up" gases are pumped into the circulating lines, sometimes at a point before the circulator, and sometimes after.

In such processes the "make-up" gases which are commercially used are not sufficiently free from undesirable gases, such as carbon dioxide, which are classed as impurities and, for the elimination of such, elaborate systems and procedural steps have been suggested. For example, the removal of these undesirable substances is usually accomplished by scrubbing the "make-up" gases with water and various chemicals at high pressure. This method, however, is costly, both in materials and labor, in that it requires high-pressure pumps in addition to the scrubbing towers.

I have found that the removal of carbon dioxide can be accomplished simply and efficiently by the use of the principles of the present invention. As above indicated, the condensers, etc. do not remove all of the ammonia from the gases coming from the converter and I have developed a method and means for utilizing the ammonia remaining in the circulating gases, herein referred to as "residual ammonia", to eliminate the carbon dioxide in the "make-up" gases.

It is well known that admixture of ammonia gas with carbon dioxide causes the two gases to combine, and that at ordinary temperatures the resultant product (ammonium carbonate) is in solid form. As will be seen from the drawings, I have provided a mixing chamber 10, which not only insures through mixing of the "circulating gases" with the "make-up" gases, but also provides ample room for the deposition of solid ammonium carbonate, thus obviating the difficulty of clogging the pipes of the circulatory system.

To facilitate this action, the chamber 10 is provided with an inlet 11 for "circulating gases", and an inlet 12 for the "make-up" gas, said inlets being preferably opposed to each other to facilitate uniform mixing. The chamber is also provided at its other end with an outlet 13 leading through the circulatory system to the converter. Since the deposition of solid ammonium carbonate is sometimes quite extensive, the chamber 10 is also provided with cleaning openings 14 and 15, which are normally closed by valves 16, and through which the chamber may be flushed out with water at occasional intervals.

It is to be understood, of course, that to facilitate such cleaning operation, the system preferably should be provided with duplicate chambers 10, which may be alternately used in the circulatory system, and one of which may be cleaned while the other is in use.

In the exemplification shown in Fig. 1, the interior of the chamber 10 contains a packing, such as broken stone or the like 17, which will not impede the flow of the gases to too great an extent and which will present sufficient voids for the accumulation of a considerable amount of solid ammonium carbonate.

In Fig. 2 is shown another form of interior construction of the chamber 10, in which opposed baffle plates 18 and 19 are substituted for the solid packing shown in Fig. 1.

While I have shown only two forms of interior construction, it will be understood that other forms of gas-mixing devices may be used, and also that the direction of flow of the gases may be reversed or otherwise changed without departing from the spirit of the invention.

Since certain changes in carrying out the above process and in the constructions set forth, which embody the invention may be made without departing from its scope, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which as a matter of language might be said to fall therebetween.

Having described my invention, what I claim as new and desire to secure by Letters Patent is:

1. In the synthesis of ammonia by circulation of a gas mixture including hydrogen and nitrogen cyclically over a catalyst, then through an ammonia separator, then over the catalyst, and so on, the improvement which comprises supplying make-up gases originally contaminated with carbon dioxide to the circulating gas mixture leaving the ammonia separator and separating ammonium carbonate formed solely by reaction with carbon dioxide present as an impurity in the make-up gases from the resulting gas mixture as a solid before the remaining gas mixture is passed over the catalyst.

2. In the synthesis of ammonia by circulation of a gas mixture including hydrogen and nitrogen cyclically over a catalyst, then through an ammonia separator, then over the catalyst, and so on, the improvement which comprises effecting reaction between the residual ammonia content of the gas mixture leaving the ammonia separator and the carbon dioxide content of make-up gases originally contaminated therewith and separating ammonium carbonate formed solely by reaction with carbon dioxide present as in impurity in the make-up gases from the resulting gas mixture including the make-up gases before the remaining gas mixture is passed over the catalyst.

3. In a process of synthetically producing ammonia, in which a mixture of hydrogen and nitrogen is passed over a catalyst and a portion of the ammonia is removed by condensation or the like, the improvement which comprises admixing the circulating gas containing residual ammonia with make-up gas containing carbon dioxide in a region of reduced velocity, and depositing solid ammonium carbonate formed solely by reaction with carbon dioxide originally present as an impurity in the make-up gas in said region.

4. In a process of synthetically producing ammonia, in which a mixture of hydrogen and nitrogen is passed over a catalyst and a portion of the ammonia is removed by condensation or the like, the improvement which comprises contacting the circulating gas containing residual ammonia with make-up gas containing carbon dioxide in a region of reduced velocity and baffled flow and depositing solid ammonium carbonate formed solely by reaction with carbon dioxide originally present as an impurity in the make-up gas in said region.

A. E. HECKER.